(12) United States Patent
Yang

(10) Patent No.: US 6,467,002 B1
(45) Date of Patent: Oct. 15, 2002

(54) SINGLE CYCLE MODIFIED ROUND-ROBIN ARBITRATION WITH EMBEDDED PRIORITY

(75) Inventor: Li-Jau Steven Yang, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/421,780

(22) Filed: Oct. 19, 1999

(51) Int. Cl.⁷ .............................................. G06F 13/14

(52) U.S. Cl. ...................... 710/116; 710/123; 710/243

(58) Field of Search ................................ 710/107, 111, 710/116, 123, 243

(56) References Cited

U.S. PATENT DOCUMENTS

| 5,623,672 A | * | 4/1997 | Popat | 710/100 |
| 5,884,051 A | * | 3/1999 | Schaffer et al. | 710/107 |
| 6,016,528 A | * | 1/2000 | Jaramillo et al. | 710/107 |
| 6,026,459 A | * | 2/2000 | Huppenthal | 710/107 |
| 6,073,132 A | * | 6/2000 | Gehman | 707/1 |
| 6,311,244 B1 | * | 10/2001 | Sheafor et al. | 710/107 |

* cited by examiner

*Primary Examiner*—Glenn A. Auve
(74) *Attorney, Agent, or Firm*—Wagner, Murabito & Hao LLP

(57) ABSTRACT

A method and system for priority arbitration in a computer environment having a shared resource capable of servicing a plurality of devices. In one embodiment, the present invention assigns an initial priority order to the plurality of devices such that those devices have priorities which are distinct. The present invention then identifies those of the plurality of devices which have issued service requests to the shared resource in a first clock cycle as requesting devices. Provided that there are more than one requesting device in the first clock cycle, the present invention selects one of the requesting devices to be serviced by the shared resource in a second clock cycle following the first clock cycle, where the selected device has the highest of the priorities among the requesting devices based on the initial priority order. The present invention also reassigns the priorities among the plurality of devices such that the selected device is assigned the lowest one of the priorities. This embodiment of the present invention thus provides a novel method and system for single cycle priority arbitration which is fair and which does not require extra memory storage for its implementation.

24 Claims, 8 Drawing Sheets

250

```
         ( Start )
             │
             ▼
┌───────────────────────────────────────────────┐
│ Identify those devices having lower priorities│
│ than that of the selected device before       │
│ priority reassignment                         │
│ 251                                           │
└───────────────────────────────────────────────┘
             │
             ▼
┌───────────────────────────────────────────────┐
│ Identify those devices having higher          │
│ priorities than that of the selected device   │
│ before priority reassignment                  │
│ 252                                           │
└───────────────────────────────────────────────┘
             │
             ▼
┌───────────────────────────────────────────────┐
│ Reassign the highest priorities to those      │
│ devices identified in step 251                │
│ 253                                           │
└───────────────────────────────────────────────┘
             │
             ▼
┌───────────────────────────────────────────────┐
│ Reassign the next highest priorities to those │
│ devices identified in step 252                │
│ 254                                           │
└───────────────────────────────────────────────┘
             │
             ▼
          ( End )
```

FIG. 2B

SINGLE CYCLE MODIFIED ROUND-ROBIN ARBITRATION WITH EMBEDDED PRIORITY

TECHNICAL FIELD

The present claimed invention relates to the field of priority arbitration. More specifically, the present claimed invention relates to fair and efficient arbitration in a computer environment wherein a common resource is shared by multiple devices or agents.

BACKGROUND ART

A modern computer system or computer network typically has a common resource (e.g., a bus or a memory subsystem in a computer system; a network adapter in a computer network) that is shared by multiple devices and/or agents (e.g., peripherals coupled to the common bus; workstations coupled to the network adapter) which issue service requests to the shared resource from time to time. In such a computer environment, a priority arbitration mechanism is needed to regulate access by the various devices to the shared resource and to resolve access contentions and conflicts that may arise, as is the case when more than one of those devices attempt to gain access to the same shared resource at the same time.

However, arbitration inevitably adds latency to operations and adversely affects the performance of the computer system or network. Prior art approaches to priority arbitration have been unsatisfactory with respect to the speed of arbitration. In particular, such prior art schemes generally require multiple clock cycles to complete the arbitration process. For example, under the traditional round-robin arbitration scheme, during a given clock cycle only one of the various devices potentially requesting access to a shared resource is checked to determine whether a request has been issued. As a result, multiple clock cycles are required to check all of the potentially requesting devices. Indeed, while a more efficient arbitration scheme is highly desirable in any environment with shared resources, it is especially critical in today's high speed applications, such as Gigabit Ethernet. Therefore, an efficient mechanism for priority arbitration is much needed in such a shared-resource environment in order to optimize the performance of computer systems and networks.

Moreover, one prior art approach to priority arbitration involves assigning a fixed priority order to the various devices which share the common resource. As such, when an access contention arises among the various devices, the requester device with the higher priority could always win in an arbitration. More particularly, since this prior art priority arbitration approach fails to address the problem that a requester device having a low priority is virtually deprived of access to the shared resource when competing with another device having a high priority under such an arrangement, this prior art approach cannot be applied to a shared-resource environment to provide fair arbitration among the various devices. Thus, a method and system for priority arbitration which achieves fairness in granting access to the shared resource is needed.

Yet another prior approach to priority arbitration attempts to remove the stranglehold that a high priority device has over other devices in a shared-resource environment by remembering the most recently served device (e.g., by using a "mark bit") and ensuring that the same device does not prevail in the next arbitration. Unfortunately, this prior art approach not only requires additional memory to implement but also increases the complexity of implementation as a result. Therefore, a method and system for priority arbitration which does not require extra memory in its implementation is desired.

Additionally, a method and system for priority arbitration suitable for use in a shared-resource environment must not require complete revamping of existing computer systems and/or networks. That is, in implementing a viable method and system for priority arbitration in a shared-resource environment, components that are well known in the art and are compatible with existing computer systems and/or networks need to be used so that the cost of realizing the method and system for priority arbitration is low. In so doing, the need to incur costly expenditures for retrofitting existing computer systems and/or networks or for building custom components is eliminated.

Thus, a need exists for a method and system for priority arbitration in a shared-resource computer environment which is highly efficient with minimal latency. A further need exists for a method and system which meets the above listed need wherein the method and system renders fair arbitration. An additional need exists for a method and system which satisfies both of the above needs and wherein no extra memory is required for its implementation. Still another need exists for a method and system which fulfills all of the above cited needs and wherein the method and system is conducive to use with existing computer systems and/or networks.

DISCLOSURE OF THE INVENTION

The present invention provides a method and system for priority arbitration in a shared-resource computer environment which is highly efficient with minimal latency, and which renders fair arbitration. The present invention further provides a method and system which does not require additional memory to implement. The present invention accomplishes the above achievements with a method and system which performs priority arbitration using a novel single cycle modified round-robin arbitration mechanism with embedded priority and which is conducive to use with existing computer systems.

Specifically, in one embodiment, the present invention assigns an initial priority order to the plurality of devices such that those devices have priorities which are distinct. The present invention then identifies those of the plurality of devices which have issued service requests to the shared resource in a first clock cycle as requesting devices. Provided that there are more than one requesting device in the first clock cycle, the present invention selects one of the requesting devices to be serviced by the shared resource in a second clock cycle following the first clock cycle, where the selected device has the highest of the priorities among the requesting devices based on the initial priority order. The present invention also reassigns the priorities among the plurality of devices such that the selected device is assigned the lowest one of the priorities. In so doing, this. embodiment of the present invention provides a novel method and system for single cycle priority arbitration which is fair and which does not require extra memory storage for its implementation.

In another embodiment, the present invention includes the above recited steps and further the present invention identifies those of the plurality of devices having priorities lower than that of the selected device before the reassignment of the priorities. The present invention then reassigns the priorities among the plurality of devices such that those of the plurality of devices identified above as having priorities lower than that of the selected device are assigned the highest ones of the priorities.

In yet another embodiment, the present invention includes the above recited steps and further the present invention identifies those of the plurality of devices having priorities higher than that of the selected device before the reassignment of the priorities. The present invention then reassigns the priorities among the plurality of devices such that those of the plurality of devices identified above as having priorities higher than that of the selected device are assigned those priorities which are lower than the priorities of those of the plurality of devices identified above as having priorities lower than that of the selected device before the reassignment.

These and other advantages of the present invention will no doubt become clear to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2B is a flow chart of steps for reassigning priorities among various devices in accordance with one embodiment of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be clear to one of ordinary skill in the art that the present invention may be practiced without these specific details. In other instances, well known methods, procedures, components, and circuits have not been described in detail as not to unnecessarily obscure aspects of the present invention.

Figure 1A:
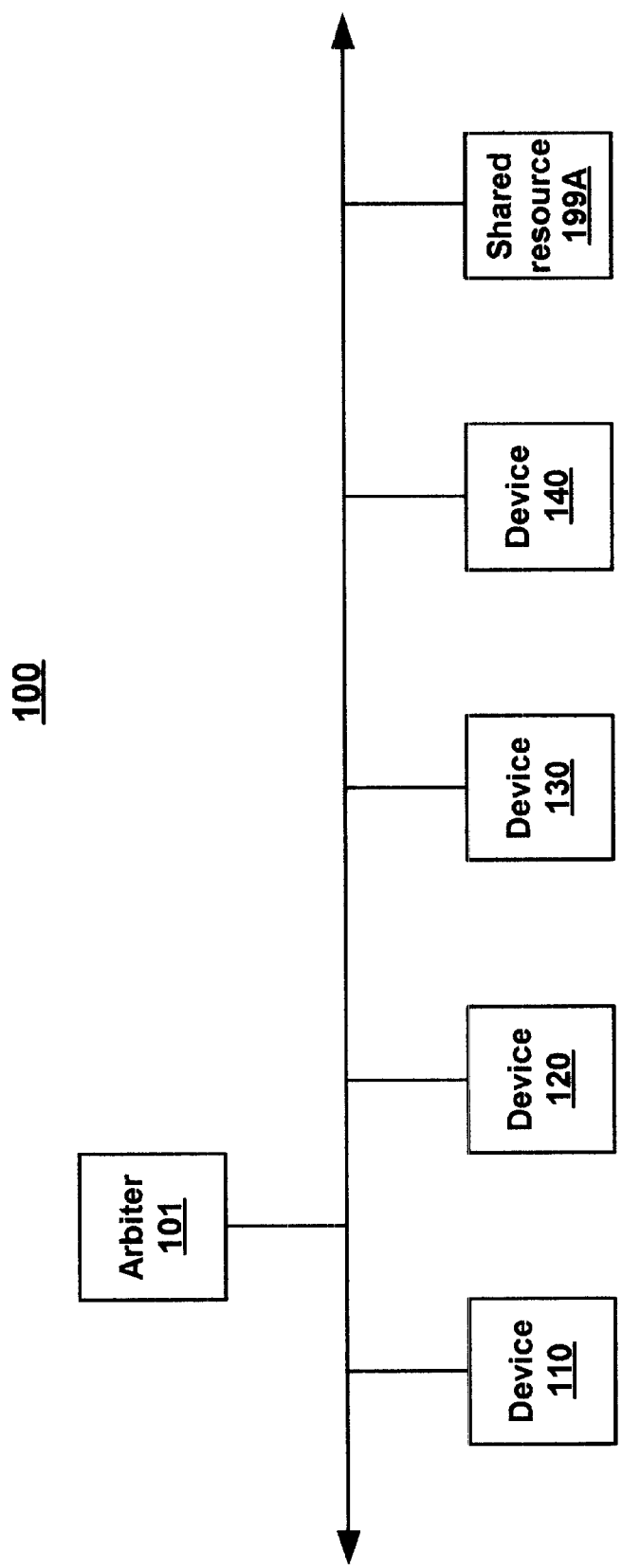
FIG. 1A is a schematic diagram of a computer environment in accordance with one embodiment of the present invention.
Figure 1B:
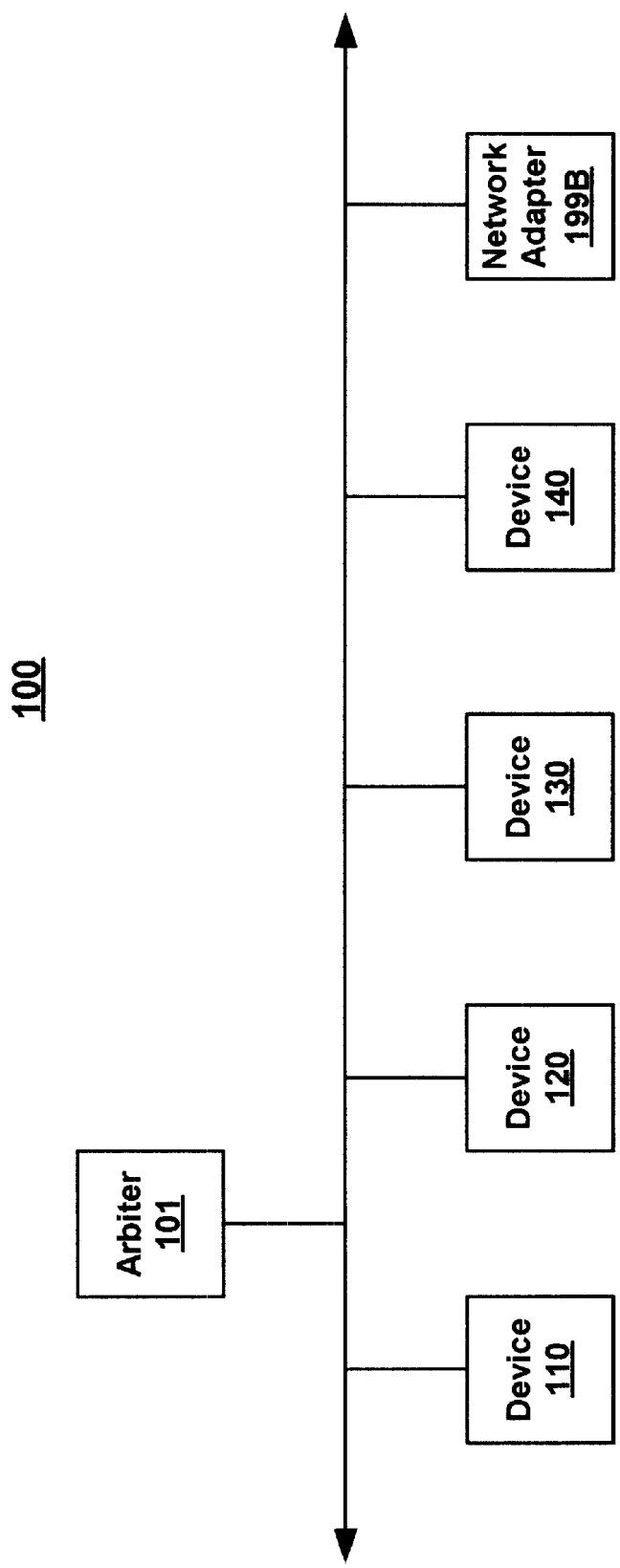
FIG. 1B is a schematic diagram of a computer environment in accordance with another embodiment of the present invention.
Figure 1C:
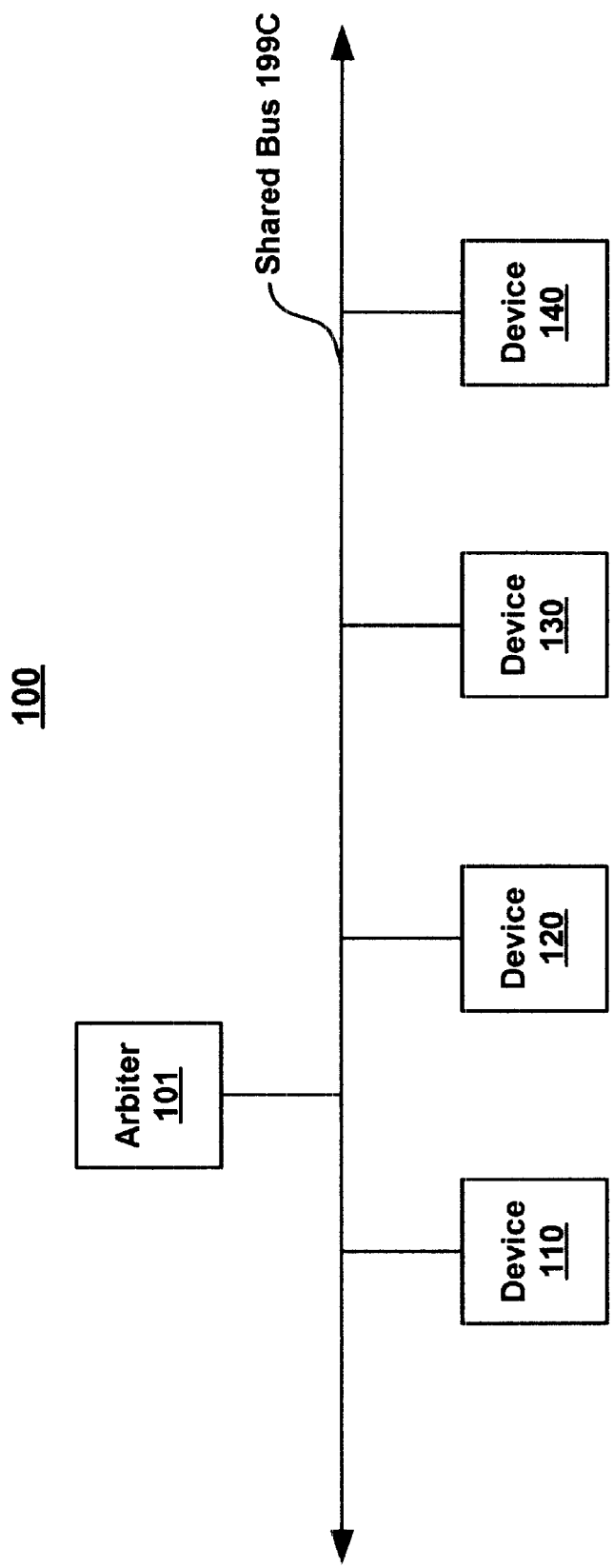
FIG. 1C is a schematic diagram of a computer environment in accordance with yet another embodiment of the present invention.
Figure 1D:
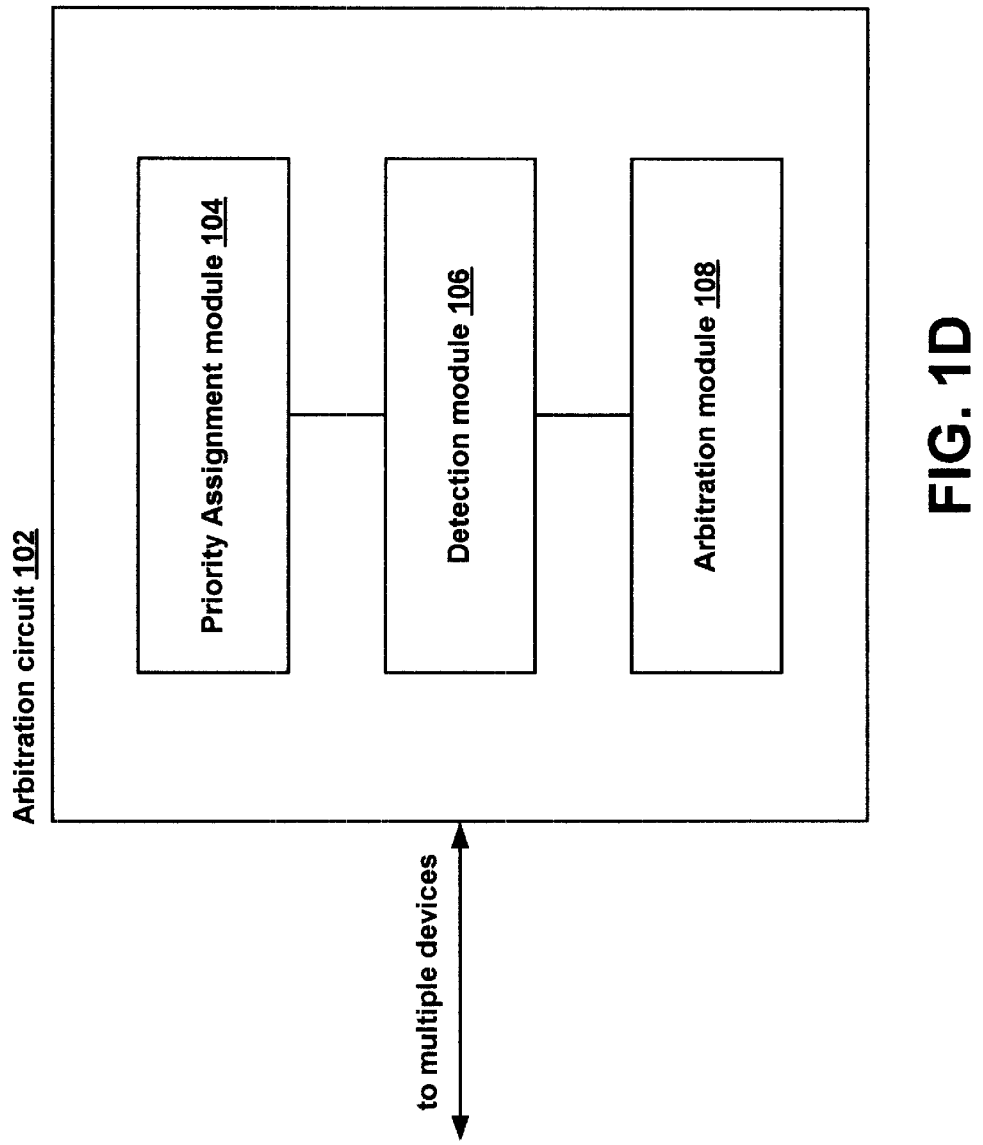
FIG. 1D is a schematic diagram of an arbitration circuit in accordance with one embodiment of the present invention.

The following description of the present invention will begin with a description of exemplary configurations of a computer environment having a shared resource shared by multiple devices with reference to FIGS. 1A, 1B and 1C, and also a description of an exemplary configuration of an arbitration circuit in accordance with one embodiment of the present invention with reference to FIG. 1D. This description will then be followed by a detailed description setting forth the operation of the present invention with reference to FIGS. 2A, 2B, 3 and 4.

Configuration of the Shared-Resource Computer Environment of the Present Invention With reference now to FIG. 1A, a schematic diagram of a computer environment in accordance with one embodiment of the present invention is shown. More particularly, in this embodiment, computer environment 100 comprises devices 110, 120, 130 and 140 and a shared resource 199A, wherein shared resource 199A is coupled to devices 110, 120, 130 and 140. In computer environment 100, each of devices 110, 120, 130 and 140 is adapted to independently issue service requests in order to gain access to shared resource 199A, while shared resource 199A is adapted to receive such service requests from devices 110, 120, 130 and 140. Moreover, computer environment 100 further includes arbiter 101, which is coupled to shared resource 199A and also to each of devices 110, 120, 130 and 140. Importantly, when more than one of devices 110, 120, 130 and 140 simultaneously request access to shared resource 199A, arbiter 101 determines the sequential order in which the requesting devices is granted access to shared resource 199A based on a priority arbitration scheme in accordance with one embodiment of the present invention as described further below.

It is appreciated that within the scope of the present invention, shared resource 199A can be any device, peripheral, sub-system, or other resource which is made available to devices 110, 120, 130 and 140 within computer environment 100 and which is capable of performing a set of tasks at the request of devices 110, 120, 130 and 140. For example, shared resource 199A can be a network adapter, a shared bus, or a memory sub-system. Thus, with reference next to FIG. 1B, a schematic diagram of a computer environment in accordance with another embodiment of the present invention is shown. More specifically, in this embodiment, the shared resource in computer environment 100 is a network adapter 199C, which is adapted to receive network access requests from devices 110, 120, 130 and 140. In computer environment 100 of FIG. 1B, arbiter 101 determines the order in which the requesting devices is granted access to network adapter 199C based on a priority arbitration scheme in accordance with one embodiment of the present invention. as described further below whenever more than one of devices 110, 120, 130 and 140 simultaneously request access to network adapter 199C.

Likewise, with reference next to FIG. 1C, a schematic diagram of a computer environment in accordance with yet another embodiment of the present invention is shown. More specifically, in this embodiment, the shared resource in computer environment 100 is a shared bus 199B, which is coupled to receive bus requests from devices 110, 120, 130 and 140. In computer environment 100 of FIG. 1C, arbiter 101 determines the order in which the requesting devices is granted access to shared bus 199B based on a priority arbitration scheme in accordance with one embodiment of the present invention as described further below whenever multiple devices among devices 110, 120, 130 and 140 simultaneously request access to shared bus 199B.

Exemplary Configuration of the Arbitration Circuit of the Present Invention

With reference next to FIG. 1D, a schematic diagram of an arbitration circuit in accordance with one embodiment of the present invention is shown. More specifically, in this exemplary embodiment, arbitration circuit 102 comprises a priority assignment module 104 which is adapted to assign and reassign priorities among multiple devices such as devices 110, 120, 130 and 140 of FIG. 1A. Arbitration circuit 102 also comprises a detection module 106 which is coupled to priority assignment module 104 and also to the multiple devices. Detection module 106 is adapted to detect service request(s) issued by the devices and to identify those devices issuing the service request(s) as requesting devices. Moreover, arbitration circuit 102 further comprises an arbitration module 108 which is coupled to detection module 106 and also to the multiple devices. As will be described below, arbitration module 108 determines the order in which the requesting devices is granted access to shared resource 199A (FIG. 1A) based on a priority arbitration scheme in accordance with one embodiment of the present invention whenever multiple devices among the multiple devices simultaneously request access to shared resource 199A. In one embodiment, arbitration circuit 102 is included within arbiter 101 of FIG. 1A.

Operation of the Priority Arbitration System of the Present Invention

Figure 2A:
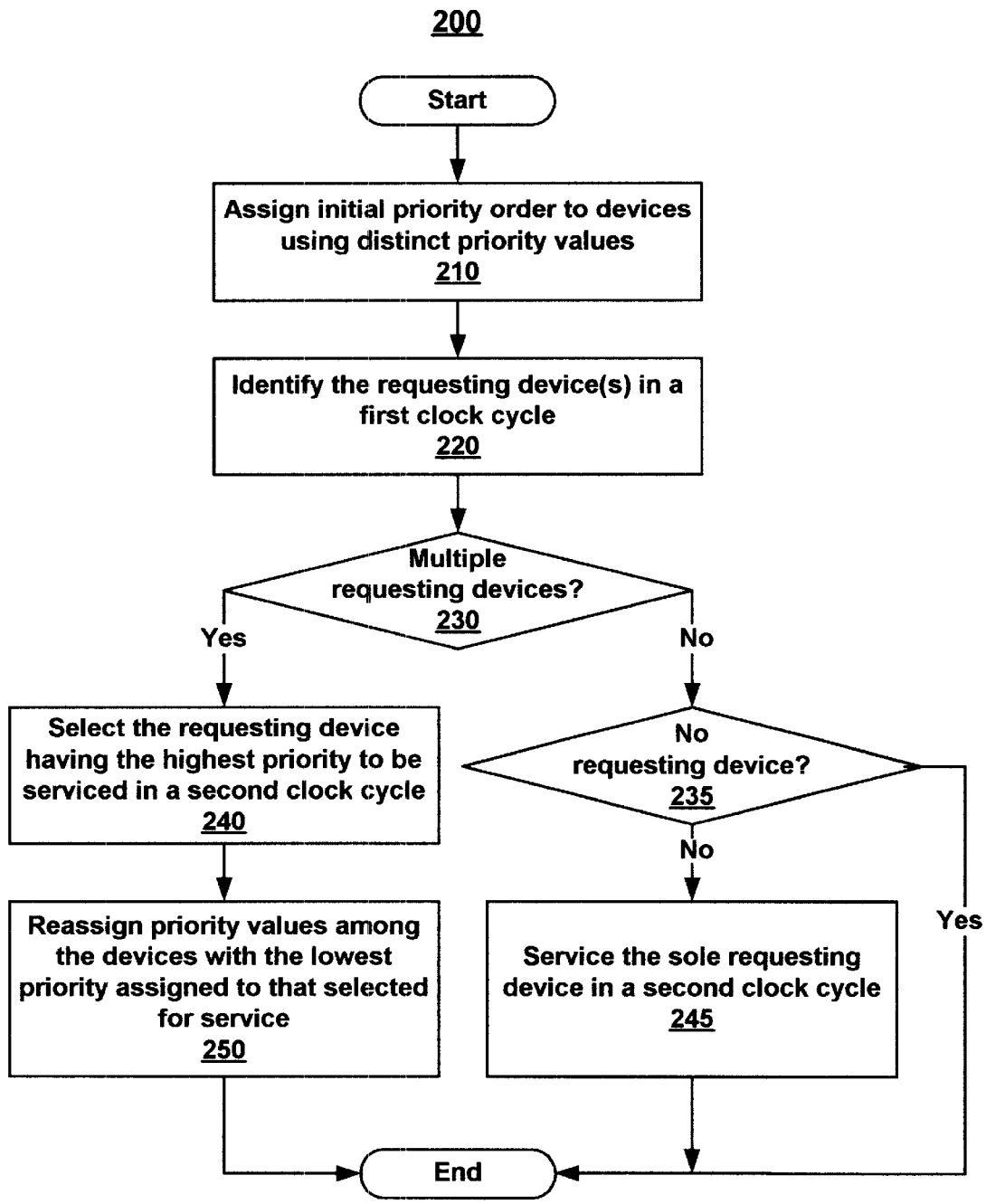
FIG. 2A is a flow chart of steps for performing priority arbitration in accordance with one embodiment of the present invention.

The following is a detailed description of the operation of the present invention. With reference now to FIG. 2A, a flow chart 200 of steps for performing priority arbitration in accordance with one embodiment of the present invention is shown. As shown in step 210, an initial priority order is assigned among the devices within a computer environment having a shared resource. Moreover, in one embodiment, distinct priorities are assigned to the various devices. An exemplary initial priority order in accordance with one embodiment of the present invention is shown in FIG. 3 and is described below.

Figure 3:
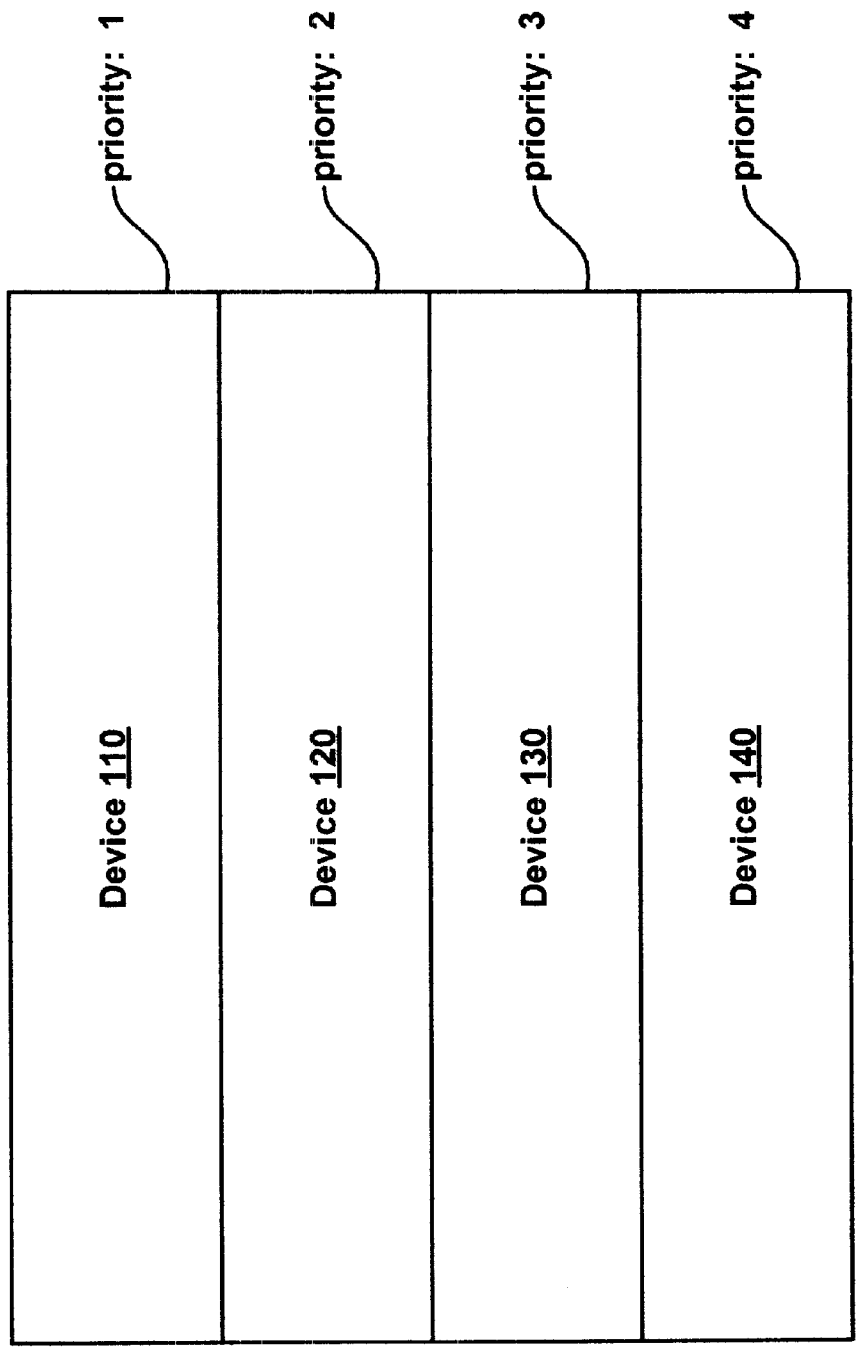
FIG. 3 is a schematic diagram of an exemplary initial priority order among four devices within a computer environment in accordance with one embodiment of the present invention.

Referring to FIG. 3, a schematic diagram of an exemplary initial priority order among four devices within a computer environment in accordance with one embodiment of the present invention is shown. In FIG. 3, the initial priority order of devices 110, 120, 130 and 140 is illustrated by a stack of four blocks, each of which is associated with a number, wherein '1' represents the highest priority and '4' represents the lowest priority. In the instant embodiment, device 110 has an initial priority of '1', device 120 has an initial priority of '2', device 130 has an initial priority of '3', and device 140 has an initial priority of '4'. Thus, in this embodiment, device 110 has the highest initial priority while device 140 has the lowest. In one embodiment, the initial priority order is assigned among devices 110, 120, 130 and 140 upon a power on reset or other disruptive events which necessitate a re-initialization of the priority order.

In this embodiment, distinct priorities are assigned to devices 110, 120, 130 and 140. As such, the possibility of a deadlock is avoided when an access contention arises among devices 110, 120, 130 and 140, since the contending devices all have distinct priorities so that one, and only one, of the contending devices would prevail in a priority arbitration in accordance with the present invention.

It is appreciated that the above described embodiment is an exemplary initial priority order in accordance with the present invention. With appropriate modifications that would be clear to one of ordinary skill in the art having read the instant description of the present invention, a different initial priority order and/or a different number of devices (e.g., more or fewer than four devices) can be used within the scope and spirit of the present invention. It is further appreciated that the initial priority order can be user designated or randomly assigned in accordance with the present invention.

Referring back to FIG. 2A, in step 220, each of the devices that has issued a service request for the shared resource in a first clock cycle is identified as a requesting device. Once the requesting device(s) have been identified, the order in which they will be serviced can be determined as described below.

It is appreciated that in a given clock cycle there may be no requesting device at all, or there may be a single requesting device, or there may be multiple requesting devices. Thus, referring still to FIG. 2A, in step 230, this embodiment of the present invention determines whether or not there are multiple requesting devices in the first clock cycle. If it is determined that there are multiple requesting devices, the present embodiment proceeds to step 240; otherwise, the present embodiment proceeds to step 235.

Referring still to FIG. 2A, in step 235, the present embodiment determines whether there is any requesting device at all in the first clock cycle. If it is determined that there is one requesting device, the present embodiment proceeds to step 245, wherein the sole requesting device is serviced in a second clock cycle. If it is determined that there is no requesting device, no action needs to be taken.

With reference still to FIG. 2A, in step 240, the present embodiment selects from among the multiple requesting devices, as identified in step 220, the one that has the highest priority to be serviced in a second clock cycle. In one embodiment, the second clock cycle is the one immediately following the first clock cycle.

Referring again to FIG. 2A, in step 250, the priorities are reassigned among the devices. In one embodiment, the device that has been selected for service in the second clock cycle is assigned the lowest priority among all the devices. By so doing, even if the device selected for service issues another service request in the following clock cycle and results in an access contention, the selected device will not prevail in the second arbitration because it now has the lowest priority among all devices after the priority reassignment. As such, each device is assured of the opportunity to gain access to the shared resource with substantially equal likelihood. In other words, no particular device is unfairly deprived of access to the shared resource because the priority order is dynamically adjusted to preclude any device from winning in successive arbitrations. Thus, this embodiment of the present invention provides a method for priority arbitration which is fair in granting access to the shared resource.

Moreover, in one embodiment, the reassigning of priorities (step 250) is performed in the first clock cycle as described in step 220. In other words, in this embodiment, the priority reassignment is performed in the same clock cycle in which the multiple service requests are issued by the various requesting devices. It is appreciated that by performing the priority reassignment in the same clock cycle in which the access contention arises, no additional memory storage is needed to earmark the device selected for service so that its priority can be adjusted in a subsequent clock cycle. Thus, this embodiment of the present invention provides a method for priority arbitration which does not require extra memory storage for its implementation. As such, not only is the resource overhead minimized in the present invention, but the present invention can also be implemented in a very cost-effective manner.

With reference next to FIG. 2B, a flow chart of steps for reassigning priorities among various devices in accordance with one embodiment of the present invention is shown. More particularly, step 250 of process 200 (FIG. 2A) is described in greater detail in accordance with one embodiment of the present invention. In step 251, the devices having lower priorities than that of the device selected for service before priority reassignment are identified.

In step 252, the devices having higher priorities than that of the device selected for service before priority reassignment are identified.

Referring again to FIG. 2B, in step 253, the devices identified in step 251 are assigned the highest priorities.

In step 254, the devices identified in step 252 are assigned the next highest of the remaining priorities.

As thus described, in one embodiment, after the device to be serviced has been selected, the priorities among the various devices are reordered such that the highest priorities are assigned to those devices having lower priorities than that of the selected device before priority reassignment, while the next highest priorities are assigned to those devices having higher priorities than that of the selected device before priority reassignment. This leaves the lowest priority to the device selected for service. As such, all devices have substantially equal opportunity to gain access to the shared resource. In particular, in this embodiment, those devices with low initial priorities are among the first to be reassigned the top priorities, thus fairness in arbitration is assured.

Figure 4:
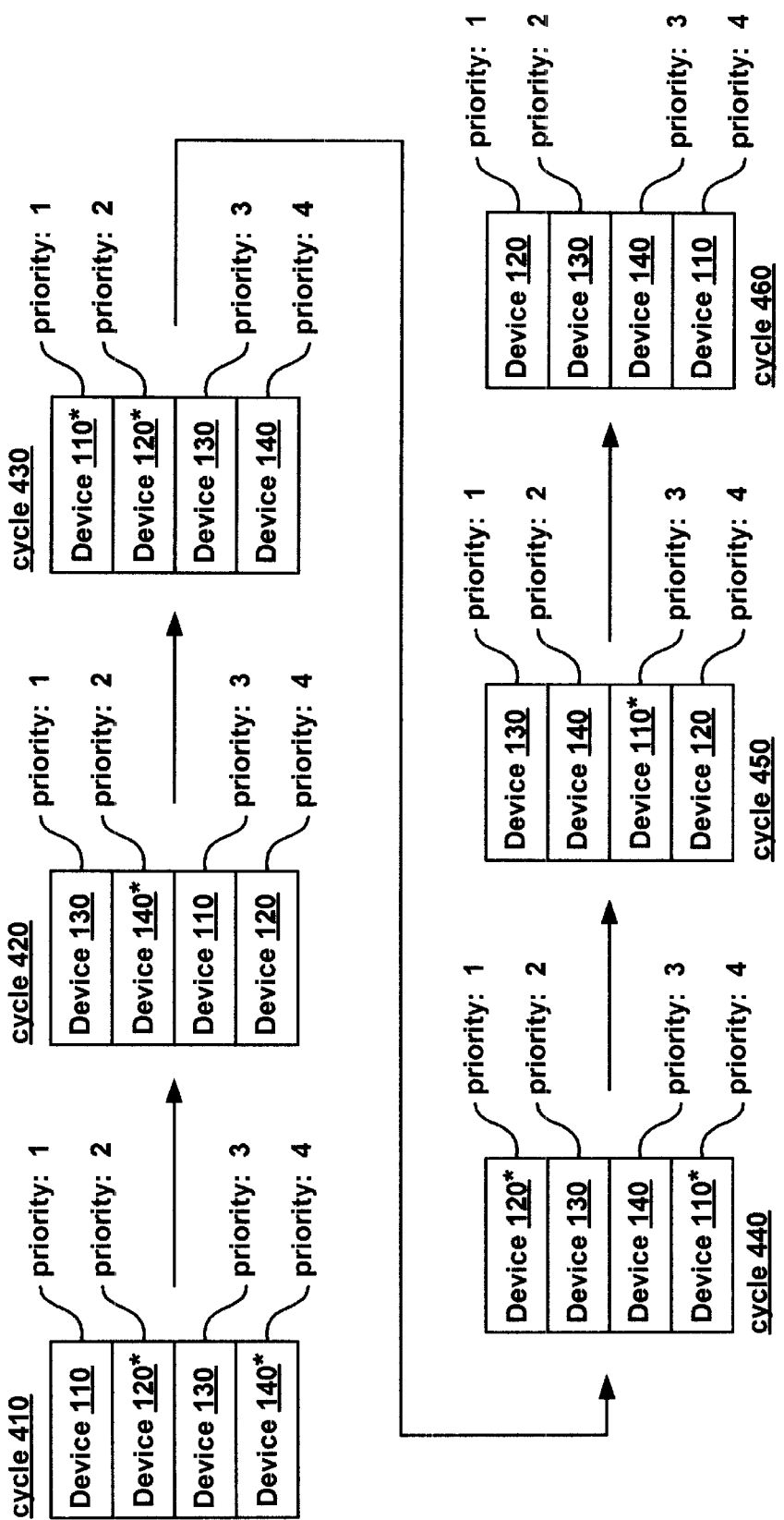
FIG. 4 is a diagram illustrating exemplary changes in priorities among four devices within a computer environment through six clock cycles in accordance with one embodiment of the present invention.

Referring next to FIG. 4, a diagram illustrating exemplary changes in priorities among four devices within a computer environment through six clock cycles in accordance with one embodiment of the present invention is shown. More specifically, in FIG. 4, a series of schematic diagrams similar to FIG. 3 are used to indicate the device(s) issuing service request(s) and the priority order among devices 110, 120, 130 and 140 at the beginning of each of six clock cycles 410 through 460. As such, the operation of the priority reassignment process described above with respect to FIG. 2B can be illustrated by way of examples.

In cycle 410 of FIG. 4, device 110 has a priority of '1', device 120 has a priority of '2', device 130 has a priority of '3', and device 140 has a priority of '4' at the beginning of cycle 410. In other words, device 110 has the highest priority and device 140 has the lowest priority at the outset. Furthermore, as indicated by the asterisks (*) in cycle 410, devices 120 and 140 each issues a service request for the shared resource in cycle 410. Since device 120 has a higher priority ('2') than device 140 does ('4'), arbiter 101 selects device 120 to be serviced in cycle 420. Moreover, in the priority reassignment, device 120 will be reassigned the lowest priority ('4') as the instant selected device. Devices 130 and 140 have lower priorities ('3' and '4', respectively) than device 120 ('2') before the reassignment and will therefore be reassigned the two highest priorities ('1' and '2', respectively).

Device 110 has a higher priority ('1') than device 120 ('2') before the reassignment and will thus be reassigned the next highest priority available ('3'). The result of this reassignment is shown in cycle 420 as described below.

Referring next to cycle 420 of FIG. 4, consistent with the discussion above regarding the priority reassignment in cycle 410, device 130 has a priority of '1', device 140 has a priority of '2', device 110 has a priority of '3', and device 120 has a priority of '4' at the beginning of cycle 420. Moreover, in cycle 420, device 140 has an outstanding service request that was originally issued in cycle 410. Since no new service request is issued in cycle 420, device 140's service request is the sole request. Arbiter 101 thus selects device 140 to be serviced in cycle 430. In the priority reassignment, device 140 will be reassigned the lowest priority as the instant selected device. Devices 110 and 120 have lower priorities than device 140 before the reassignment and will therefore be reassigned the two highest priorities. Device 130 has a higher priority than device 120 before the reassignment and will thus be reassigned the next highest priority available. The result of this reassignment is illustrated below with respect to cycle 430.

Referring still to FIG. 4, in cycle 430, after the priority reassignment in cycle 420, device 110 has a priority of '1', device 120 has a priority of '2', device 130 has a priority of '3', and device 140 has a priority of '4' at the beginning of cycle 430. Also in cycle 430, devices 110 and 120 each issues a service request. Since device 110 has a higher priority than device 120, arbiter 101 selects device 110 to be serviced in cycle 440. Thus, in the priority reassignment, device 110 will be reassigned the lowest priority as the instant selected device. Devices 120, 130 and 140 all have lower priorities than device 110 before the reassignment and will therefore be reassigned the highest priorities. The result of this reassignment is described below in the description regarding cycle 440.

With reference still to FIG. 4, at the beginning of cycle 440, after the priority reassignment in cycle 430, device 120 has a priority of '1', device 130 has a priority of '2', device 140 has a priority of '3', and device 110 has a priority of '4'. Furthermore, in cycle 440, device 120 has an outstanding service request that was originally issued in cycle 430, while device 110 issues another service request. Since device 120 has a higher priority than device 110, arbiter 101 selects device 120 to be serviced in cycle 450. Note that since device 110 now has the lowest priority as a result of its being selected in cycle 430 for service in the instant cycle, device 110 is destined to lose the arbitration in cycle 440 if device 110 issues a successive service request, as is the case here. Also, in the priority reassignment of cycle 440, device 120 will be reassigned the lowest priority as the instant selected device. Devices 130, 140 and 110 all have lower priorities than device 120 before the reassignment and will therefore be reassigned the highest priorities. The result of this reassignment is depicted in cycle 450 as described below.

Referring yet again to FIG. 4, in cycle 450, device 130 has a priority of '1', device 140 has a priority of '2', device 110 has a priority of '3', and device 120 has a priority of '4' at the beginning of cycle 420. Moreover, in cycle 450, device 110 has an outstanding service request that was originally issued in cycle 440. Since no new service request is issued in cycle 450, arbiter 101 simply selects device 110 to be serviced in cycle 460. In the instant priority reassignment, device 110 will be reassigned the lowest priority as the instant selected device. Device 120 has a lower priority than device 110 before the reassignment and will therefore be reassigned the highest priority. Devices 130 and 140 have higher priorities than device 110 before the reassignment and will thus be reassigned the next highest priorities available. The result of this reassignment is presented below with respect to cycle 460.

With reference once again to FIG. 4, at the beginning of cycle 460, after the priority reassignment in cycle 450, device 120 has a priority of '1', device 130 has a priority of '2', device 140 has a priority of '3', and device 110 has a priority of '4'. Furthermore, in cycle 460, no outstanding service request remains and no new service request is issued. Thus, no priority arbitration needs to be performed in cycle 460.

It is appreciated that the priority reassignment scheme described above is exemplary, and that modifications are feasible within the scope of the present invention. In particular, cycle 410 of FIG. 4 can be used as an illustration of an alternative embodiment. In FIG. 4, at the beginning of cycle 410, devices 110, 120, 130 and 140 have priorities of '1', '2', '3', and '4', respectively, and devices 120 and 140 each issues a service request. In the priority reassignment of this alternative embodiment, device 120 will still be reassigned the lowest priority ('4') as the instant selected device. But instead of reassigning lower priorities to device(s) that have higher priorities than the selected device (device 120 in this case) before the reassignment (device 110 in this case), device(s) that have lower priorities than the selected device before the reassignment (devices 130 and 140 in this case) move up in the priority order while the device(s) that have higher priorities than the selected device before the reassignment simply retain their priorities. Thus, the result of this alternative reassignment is: device 110 has a priority of '1', device 130 has a priority of '2', device 140 has a priority of '3', and device 120 has a priority of '4' at the beginning of cycle 420.

It is further appreciated that while the present invention is illustrated above with reference to a four-device environment, the present invention is easily adapted for use in any multiple-device environment. For example, embodiments of the present invention can be used in a high speed network environment like a Gigabit Ethernet. Other embodiments of the present invention are applicable to different bus environments such as a peripheral component interconnect bus (PCI) environment and a universal serial bus (USB) environment. Indeed, the present invention is well suited for use with any computer environment with unified memory architecture having multiple ports or devices where priority arbitration is necessary.

Furthermore, although specific configurations are shown in the embodiments of FIG. 1A, 1B and 1C, the present invention is also well suited to using various alternatives, modifications, and equivalents, which are included within the spirit and scope of the present claimed invention.

Thus, by furnishing a single cycle modified round-robin arbitration mechanism, the present invention provides a system and method for priority arbitration that delivers high performance and also ensures fairness in arbitration which is well-suited for use in a shared-resource environment.

Furthermore, by eliminating the need for extra memory storage, as is the case in some prior art methods described above, the present invention provides a method and system for priority arbitration that can be implemented in a very cost-efficient manner. Moreover, by using components that are commonly used in the art, the present invention does not require expensive retrofitting of existing computer systems and/or networks. Thus, the present invention is highly conducive for use with existing computer systems and/or networks.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for priority arbitration in a computer environment having a shared resource capable of servicing a plurality of devices, said method comprising the steps of:

a) assigning an initial priority order to said plurality of devices such that said plurality of devices have priorities which are distinct;

b) identifying a plurality of requesting devices from among said plurality of devices, each of said plurality of requesting devices having issued a service request for said shared resource in a first clock cycle;

c) provided that there are more than one of said plurality of requesting devices in said first clock cycle, selecting one of said plurality of requesting devices to be serviced by said shared resource in a second clock cycle following said first clock cycle, said selected device having the highest of said priorities among said plurality of requesting devices based on said initial priority order;

d) reassigning said priorities among said plurality of devices such that said selected device is assigned the lowest one of said priorities;

d1) identifying those of said plurality of devices having said priorities lower than that of said selected device before said step d);

d2) reassigning said priorities among said plurality of devices such that those of said plurality of devices identified in said step d1) are assigned the highest ones of said priorities;

d3) identifying those of said plurality of devices having said priorities higher than that of said selected device before said step d); and d4) reassigning said priorities among said plurality of devices such that those of said plurality of devices identified in said step d3) are assigned those ones of said priorities which are lower than said priorities of those of said plurality of devices identified in said step d1).

2. The method as recited in claim 1 wherein said step d) is performed in said first clock cycle.

3. The method as recited in claim 1 wherein said second clock cycle immediately follows said first clock cycle.

4. The method as recited in claim 1 wherein no extra memory storage is required for performing said reassigning.

5. The method as recited in claim 1 wherein said step a) is performed upon reset of said computer environment.

6. The method as recited in claim 1 wherein said computer environment has a unified memory architecture.

7. The method as recited in claim 1 wherein said shared resource is a bus.

8. The method as recited in claim 1 wherein said shared resource is a network adapter.

9. In a computer environment having a plurality of devices, a priority arbitration system comprising:

a shared resource capable of fulfilling service requests received from said plurality of devices; and an arbiter coupled to said shared resource and also to said plurality of devices; said arbiter adapted to assign an initial priority order to said plurality of devices such that said plurality of devices have priorities which are distinct; said arbiter also adapted to identify a plurality of requesting devices from among said plurality of devices, each of said plurality of requesting devices having issued a service request for said shared resource in a first clock cycle; said arbiter further adapted to select one of said plurality of requesting devices to be serviced by said shared resource in a second clock cycle following said first dock cycle, said selected device having the highest of said priorities among said plurality of requesting devices based on said initial priority order, provided that there are more than one of said plurality of requesting devices in said first clock cycle; said arbiter further adapted to reassign said priorities among said plurality of devices such that said selected device is assigned the lowest one of said priorities; said arbiter is further adapted to reassign said priorities among said plurality of devices such that those of said plurality of devices having said priorities lower than that of said selected device before said reassigning are assigned the highest ones of said priorities; and said arbiter is further adapted to reassign said priorities among said plurality of devices such that those of said plurality of devices having said priorities higher than that of said selected device before said reassigning are assigned those ones of said priorities which are lower than said priorities of those of said plurality of devices having said priorities lower than that of said selected device before said reassigning.

10. The priority arbitration system as recited in claim 9 wherein said reassigning is performed in said first clock cycle.

11. The priority arbitration system as recited in claim 9 wherein said second clock cycle immediately follows said first clock cycle.

12. The priority arbitration system as recited in claim 9 wherein no extra memory storage is required for performing said reassigning.

13. The priority arbitration system as recited in claim 9 wherein said arbiter assigns said initial priority order upon reset of said computer environment.

14. The priority arbitration system as recited in claim 9 wherein said computer environment has a unified memory architecture.

15. The priority arbitration system as recited in claim 9 wherein said shared resource is a bus.

16. The priority arbitration system as recited in claim 9 wherein said shared resource is a network adapter.

17. A circuit for performing priority arbitration in a computer environment having a shared resource and a plurality of devices, said circuit comprising:

a priority assignment module adapted to assign an initial priority order to said plurality of devices such that said plurality of devices have priorities which are distinct;

a detection module coupled to said priority assignment module and also to said plurality of devices, said detection module adapted to detect service requests being sent from said plurality of devices to said shared resource, said detection module also adapted to identify a plurality of requesting devices from among said plurality of devices, each of said plurality of requesting devices having issued a service request for said shared resource in a first clock cycle;

an arbitration module coupled to said detection module and also to said plurality of devices, said arbitration module adapted to select one of said plurality of requesting devices to be serviced by said shared resource in a second clock cycle following said first clock cycle, said selected device having the highest of said priorities among said plurality of requesting devices based on said initial priority order, provided that there are more than one of said plurality of requesting devices in said first clock cycle;

said priority assignment module further adapted to reassign said priorities among said plurality of devices such that said selected device is assigned the lowest one of said priorities;

said priority assignment module is further adapted to reassign said priorities among said plurality of devices such that those of said plurality of devices having said priorities lower than that of said selected device before said reassigning are assigned the highest ones of said priorities; and said priority assignment module is further adapted to reassign said priorities among said plurality of devices such that those of said plurality of devices having said priorities higher than that of said selected device before said reassigning are assigned those ones of said priorities which are lower than said priorities of those of said plurality of devices having said priorities lower than that of said selected device before said reassigning.

18. The circuit as recited in claim 17 wherein said priority assignment module performs said reassigning in said first clock cycle.

19. The circuit as recited in claim 17 wherein said second clock cycle immediately follows said first clock cycle.

20. The circuit as recited in claim 17 wherein no extra memory storage is required for performing said reassigning.

21. The circuit as recited in claim 17 wherein said priority assignment module assigns said initial priority order upon reset of said computer environment.

22. The circuit as recited in claim 17 wherein said computer environment has a unified memory architecture.

23. The circuit as recited in claim 17 wherein said shared resource is a bus.

24. The circuit as recited in claim 17 wherein said shared resource is a network adapter.

* * * * *